(12) United States Patent
Shin

(10) Patent No.: US 9,010,737 B2
(45) Date of Patent: Apr. 21, 2015

(54) SEAT HEIGHT ADJUSTING APPARATUS FOR VEHICLE

(75) Inventor: Chun-Ho Shin, Chungcheongnam-do (KR)

(73) Assignee: Han Il E Hwa, Co., Ltd., Seoul (KR)

( * ) Notice: Subject to any disclaimer, the term of this patent is extended or adjusted under 35 U.S.C. 154(b) by 159 days.

(21) Appl. No.: 13/704,785

(22) PCT Filed: Jun. 20, 2011

(86) PCT No.: PCT/KR2011/004471
§ 371 (c)(1),
(2), (4) Date: Feb. 11, 2013

(87) PCT Pub. No.: WO2012/023699
PCT Pub. Date: Feb. 23, 2012

(65) Prior Publication Data
US 2013/0140865 A1     Jun. 6, 2013

(30) Foreign Application Priority Data

Aug. 18, 2010 (KR) .................... 10-2010-0079685

(51) Int. Cl.
| A47C 1/00 | (2006.01) |
| B60N 2/16 | (2006.01) |
| B60N 2/50 | (2006.01) |
| B60N 2/52 | (2006.01) |

(52) U.S. Cl.
CPC .............. B60N 2/1665 (2013.01); B60N 2/162 (2013.01); B60N 2/502 (2013.01); B60N 2/505 (2013.01); B60N 2/508 (2013.01); B60N 2/525 (2013.01)

(58) Field of Classification Search
USPC .................. 267/64.28, 64.27, 120, 131, 142; 297/344.12, 338; 248/421, 422, 423
See application file for complete search history.

(56) References Cited

U.S. PATENT DOCUMENTS

| 4,645,169 | A | * | 2/1987 | Mischer | 248/550 |
| 5,176,355 | A | * | 1/1993 | Carter | 248/550 |
| 5,533,703 | A | * | 7/1996 | Grassl et al. | 248/550 |
| 5,735,509 | A | * | 4/1998 | Gryp et al. | 267/131 |
| 6,616,116 | B1 | * | 9/2003 | Rochau et al. | 248/564 |
| 7,712,836 | B2 | * | 5/2010 | Deml | 297/344.16 |
| 8,308,135 | B2 | * | 11/2012 | Viste | 254/93 VA |
| 8,544,813 | B2 | * | 10/2013 | Enns et al. | 248/588 |
| 8,789,804 | B2 | * | 7/2014 | Shin | 248/422 |
| 2010/0224846 | A1 | * | 9/2010 | Viste | 254/93 VA |
| 2013/0126684 | A1 | * | 5/2013 | Shin | 248/157 |
| 2013/0168624 | A1 | * | 7/2013 | Shin | 254/93 R |
| 2013/0292983 | A1 | * | 11/2013 | Wilhelm et al. | 297/344.16 |

FOREIGN PATENT DOCUMENTS

| JP | 2008049852 | 3/2008 |
| KR | 20-0293230 | 10/2002 |

OTHER PUBLICATIONS

International Search Report for PCT/KR2011/004471 Jan. 2, 2012.

* cited by examiner

Primary Examiner — Thomas Irvin
(74) Attorney, Agent, or Firm — Pearne & Gordon LLP

(57) ABSTRACT

A seat height adjusting apparatus for a vehicle includes an air spring configured to raise or lower a seat of the vehicle, a control valve connected to the air spring and configured to selectively supply air to the air spring, a push rod configured to selectively press an air injection pin or an air discharge pin of the control valve, an arm rod fastened to the push rod and configured to rotate the push rod, a height adjusting cable fastened to one side of the arm rod and configured to rotate the arm rod, and a height adjusting lever configured to move the height adjusting cable in one direction.

3 Claims, 5 Drawing Sheets

SEAT HEIGHT ADJUSTING APPARATUS FOR VEHICLE

BACKGROUND OF THE INVENTION

The present invention relates to a seat height adjusting apparatus for a vehicle and, more particularly, to a seat height adjusting apparatus for a vehicle which improves the convenience of seat height adjusting for a passenger.

Conventionally, a seat of a vehicle is equipped with devices for adjusting the positions of a seat back and a seat cushion so as to be fitted to a physique of a passenger. The seat of the vehicle is generally configured to operate, by way of a lever device, to adjust the angle of the seat back. Further, the seat of the vehicle is provided with a device capable of adjusting the height of the seat cushion if necessary.

This conventional device for adjusting the height of the seat cushion is generally made up of a separate cylinder and valves for controlling the cylinder. The cylinder-type height adjusting method has disadvantages in that it requires many components and a complicated manufacturing process, and that a lever adjusting device should be pulled until the seat cushion reaches a height at a desired position.

Thus, there is a need to develop a device capable of further simplifying a configuration of the device for adjusting the height of the seat for the vehicle and of adjusting the height with a more convenient operation.

SUMMARY OF THE INVENTION

An embodiment of the present invention is directed to a seat height adjusting apparatus for a vehicle, which easily adjusts a height of a seat of the vehicle so as to be suitable for the physique and posture preferences of a passenger, to thereby improve the riding convenience and riding comfort of the passenger.

In accordance with an embodiment of the present invention, a seat height adjusting apparatus for a vehicle includes: an air spring configured to raise or lower a seat of the vehicle; a control valve connected to the air spring and configured to selectively supply air to the air spring; a push rod configured to selectively press an air injection pin or an air discharge pin of the control valve; an arm rod fastened to the push rod and configured to rotate the push rod; a height adjusting cable fastened to one side of the arm rod and configured to rotate the arm rod; and a height adjusting lever configured to move the height adjusting cable in one direction.

DESCRIPTION OF SPECIFIC EMBODIMENTS

Figure 1:
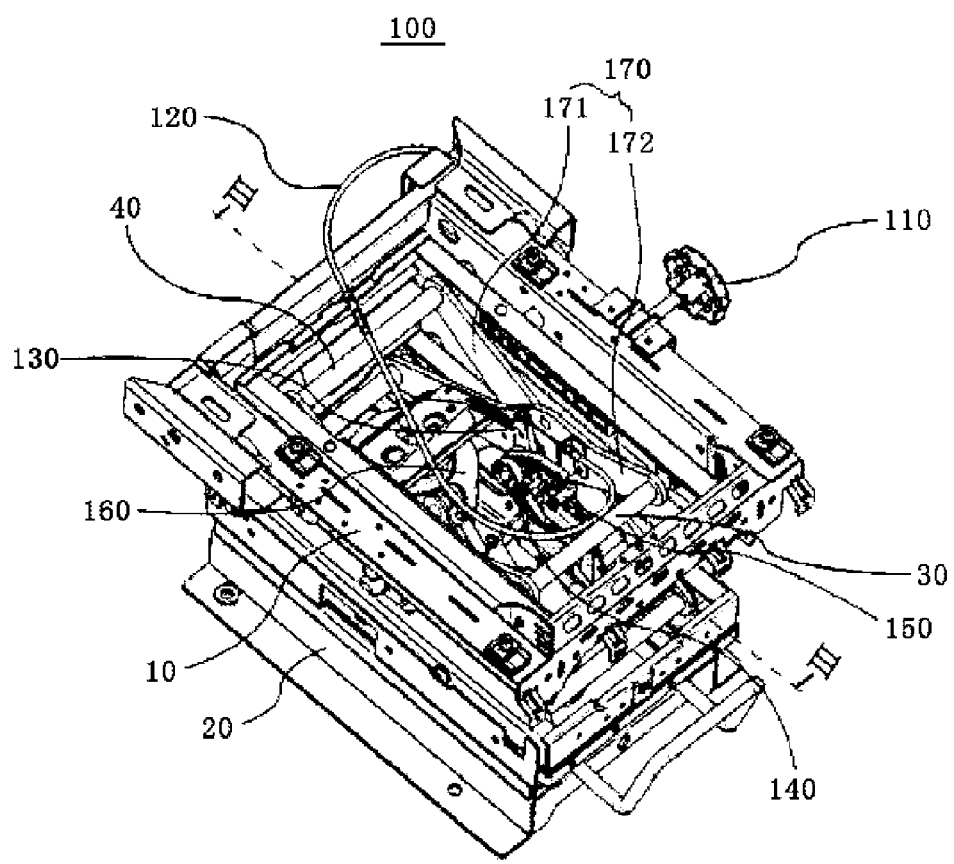
FIG. 1 is a perspective view showing a seat height adjusting apparatus for a vehicle according to an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 1 is a perspective view showing a seat height adjusting apparatus 100 for a vehicle according to an embodiment of the present invention.

Referring to FIG. 1, the seat height adjusting apparatus 100 for a vehicle includes a height adjusting lever 110, a height adjusting cable 120, an arm rod 130, a push rod 140, a control valve 150, and an air spring 160.

Further, the seat height adjusting apparatus 100 for a vehicle may include an upper frame 10 and a lower frame 20, both of which are fastened to a lower portion of a seat (not shown) of the vehicle. The seat height adjusting apparatus 100 for a vehicle may further include an X-shaped link 170 moving the upper frame 10 and the lower frame 20 along a vertical direction.

The X-shaped link 170 may include an outer link 171 and an inner link 172. The outer link 171 and the inner link 172 may be fastened so as to perpendicularly cross each other. That is, a shape in which the outer link 171 is fastened to the inner link 172 may become an "X" shape.

The air spring 160 can raise or lower the vehicle seat. The air spring 160 can move the X-shaped link 170 in an upward or downward direction. As the X-shaped link 170 moves, the height of the vehicle seat can be adjusted.

For example, when an internal air amount of the air spring 160 is increased, the air spring 160 can push the X-shaped link 170 in an upward direction. When the X-shaped link 170 moves in the upward direction, the width of the X-shaped link 170 can be reduced. When the width of the X-shaped link 170 is reduced, the vehicle seat can be raised.

Further, when the internal air amount of the air spring 160 is reduced, the air spring 160 can move the X-shaped link 170 in a downward direction. When the X-shaped link 170 moves in the downward direction, the width of the X-shaped link 170 can be increased. When the width of the X-shaped link 170 is increased, the vehicle seat can be lowered. Thus, the height of the vehicle seat can be adjusted.

In one embodiment of the present invention, the height adjusting cable 120 may be used as a means for adjusting the width of the X-shaped link 170. Further, the height adjusting cable 120 may be connected with the height adjusting lever 110.

The height adjusting lever 110 can be rotated by a passenger. Here, the height adjusting lever 110 can be rotated in a first direction. Further, the height adjusting lever 110 can be rotated in a second direction.

For convenience of description, on the assumption that the first direction is a clockwise direction and that the second direction is a counterclockwise direction, the following description will be made.

When the height adjusting lever 110 is rotated in the clockwise direction, the height adjusting cable 120 can move in one direction. When the height adjusting lever 110 is rotated in the counterclockwise direction, the height adjusting cable 120 can move in the other direction.

In this way, the height adjusting cable 120 can move in a direction in which the height adjusting lever 110 is rotated. As the height adjusting cable 120 moves, the arm rod 130 can be rotated. When the arm rod 130 is rotated, the push rod 140 can be rotated.

When the push rod 140 is rotated, an air injection pin 151 or an air discharge pin 152 of the control valve 150 can be selectively pressed. Thus, the control valve 150 can adjust an amount of air that flows into or out of the air spring 160.

Further, according to the amount of air that flows into or out of the air spring 160, the width or height of the X-shaped link 170 can be adjusted. In the process by which the width or height of the X-shaped link 170 is adjusted, the height of the vehicle seat can be adjusted. The entire width or height of the X-shaped link 170 can be adjusted by a movable shaft 30 and a stationary shaft 40.

Figure 2:
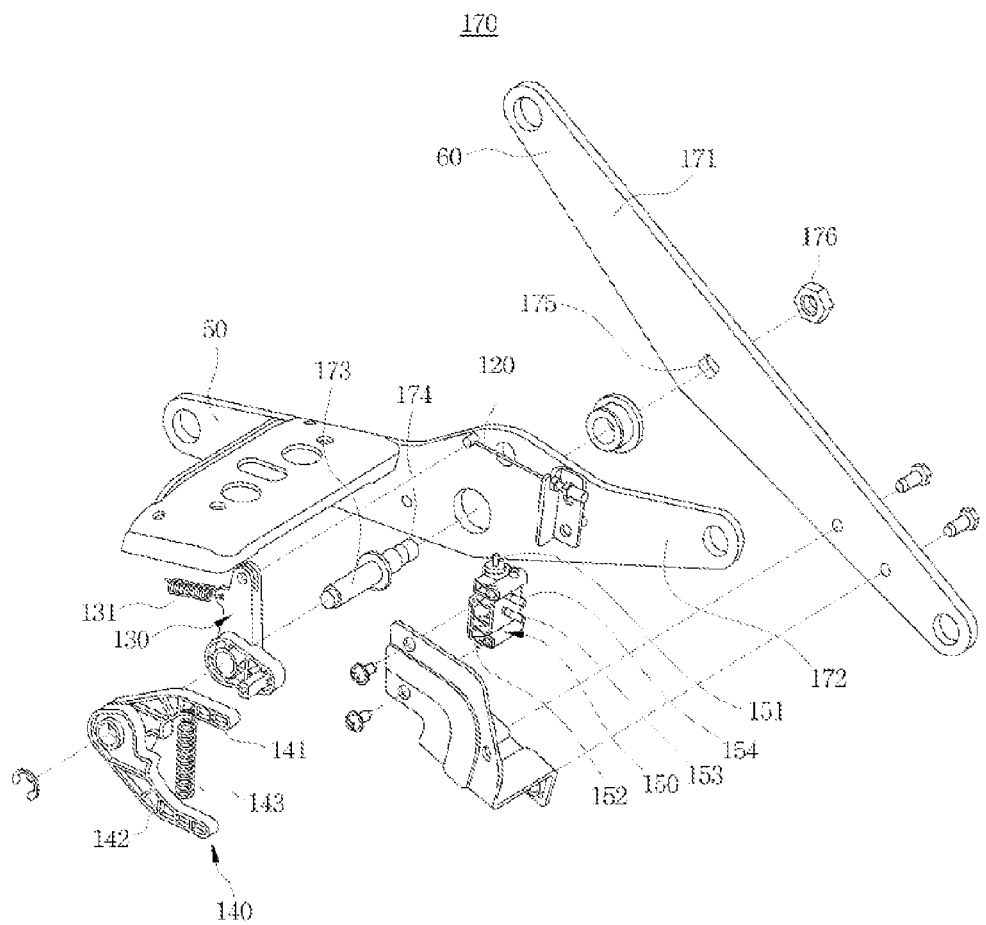
FIG. 2 is an exploded perspective view of the X-shaped link shown in FIG. 1.

FIG. 2 is an exploded perspective view of the X-shaped link 170 shown in FIG. 1.

Referring to FIG. 2, the X-shaped link 170 includes an outer link 171 and an inner link 172. The outer link 171 and the inner link 172 may be coupled via a shaft key 173 and a guide flat 174 which pass through the central axes thereof.

The guide flat 174 passes through a key hole 175 of the outer link 171, and may be coupled with a key fixing nut 176. The height adjusting cable 120 may be fastened to an upper end of the inner link 172.

Further, the arm rod 130 may be rotatably coupled with the inner link 172 via the shaft key 173. The arm rod spring 131 may be connected to the air spring 160. An end of the arm rod 130 may be connected with the height adjusting cable 120. Thus, a rotating direction of the arm rod 130 may be adjusted on the basis of the movement of the height adjusting cable 120.

Also, the center of the arm rod 130 may be rotatably coupled with the center of the push rod 140. As the arm rod 130 rotates, an upper push rod 141 and a lower push rod 142 can be rotated. The upper and lower push rods 141 and 142 may be coupled to each other via a push rod spring 143.

The push rod 140 may be rotated on the basis of the rotation of the arm rod 130. Here, the upper and lower push rods 141 and 142 may be pulled by a push rod spring 143.

For example, when the arm rod 130 rotates, the upper push rod 141 of the push rod 140 may be rotated. The upper push rod 141 may pull the lower push rod 142 using the push rod spring 143. Thus, the lower push rod 142 may press the air discharge pin 152 of the control valve 150.

Further, when the arm rod 130 rotates, the lower push rod 142 of the push rod 140 can be rotated. The lower push rod 142 may pull the upper push rod 141 using the push rod spring 143. Thus, the upper push rod 141 may press the air injection pin 151 of the control valve 150.

The control valve 150 may include the air injection pin 151 at an upper portion thereof. The control valve 150 may include the air discharge pin 152 at a lower portion thereof. The control valve 150 may selectively supply air to the air spring 160 using the air injection pin 151 and the air discharge pin 152.

The control valve 150 may be connected with an external compressed air tank. The control valve 150 may include a compressed air supply port 153 supplied with compressed air. The control valve 150 may include an air spring connection port 154 connected with the air spring 160 in order to supply the supplied air to the air spring 160.

Figure 3:
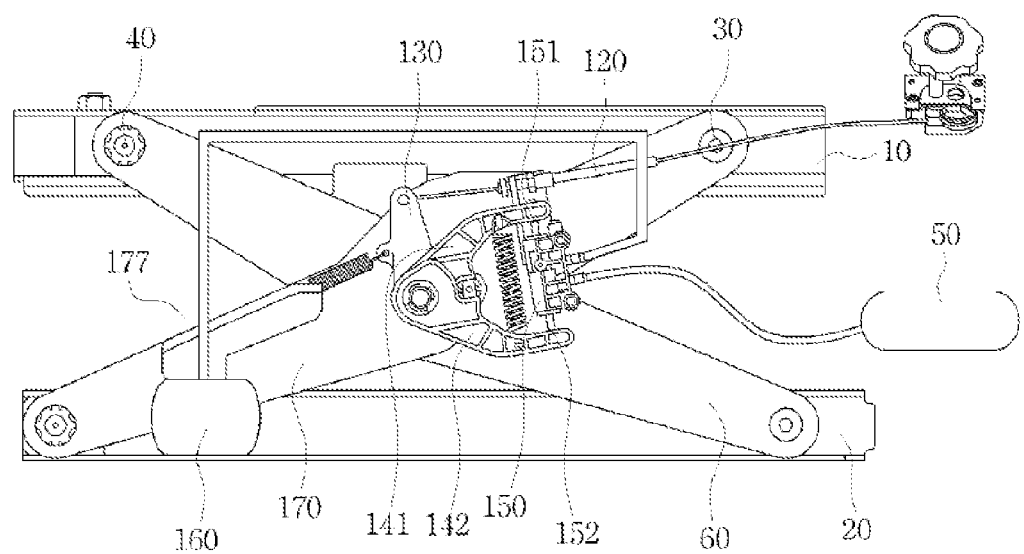
FIG. 3 is a cross-sectional view taken along line III-III of FIG. 1.

FIG. 3 is a cross-sectional view taken along line III-III of FIG. 1.

Referring to FIG. 3, when a passenger takes a seat without adjusting the height of the vehicle seat, the upper and lower frames 10 and 20 may maintain a height of a default state.

The upper and lower push rods 141 and 142 may not press the air injection pin 151 and the air discharge pin 152 of the control valve 150. Thus, an amount of compressed air in the air spring 160 can be kept constant. As a result, the movable shaft 30 of the upper frame 10 does not move, and thus the width or height of the X-shaped link 170 may not be changed.

Figure 4:
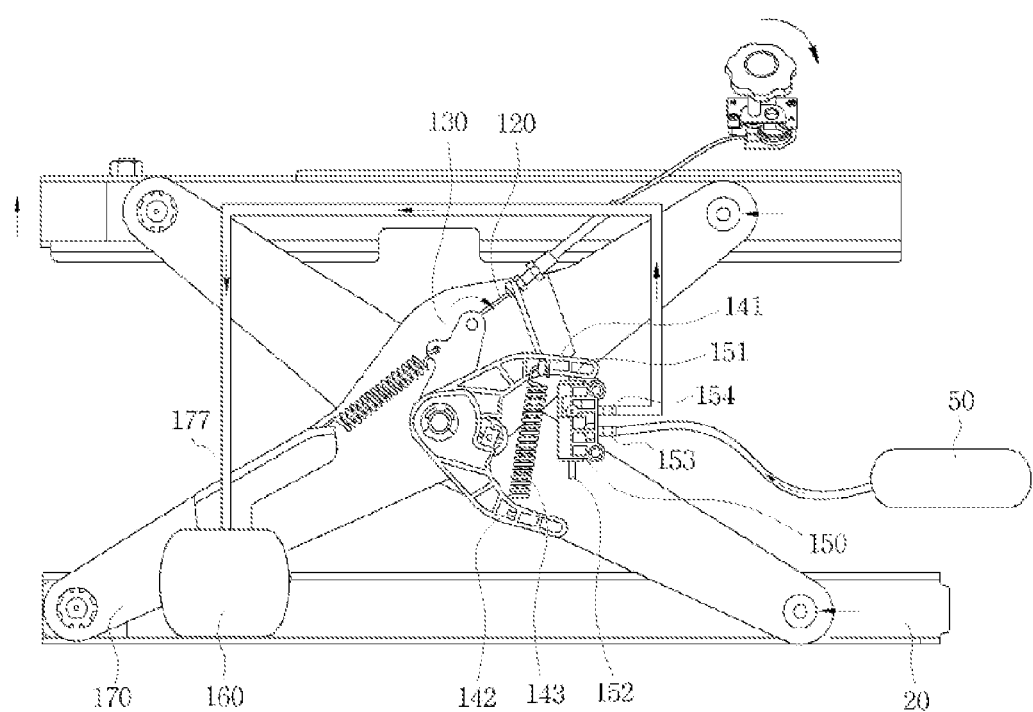
FIG. 4 is a view showing a first operation state of the seat height adjusting apparatus of the present invention.

FIG. 4 is a view showing a first operation state of the seat height adjusting apparatus of the present invention.

Referring to FIG. 4, when the height adjusting lever 110 is rotated in a clockwise direction, the height adjusting cable 120 connected to the height adjusting lever 110 may move in one direction. Here, an end of the height adjusting cable 120 may be connected with the arm rod 130.

Thus, the arm rod 130 may be rotated about its central axis by a predetermined angle in the clockwise direction. The predetermined angle may be based on an amount of rotation of the height adjusting lever 110.

As the arm rod 130 rotates, the lower push rod 142 can be rotated in a clockwise direction. When the lower push rod 142 is rotated in the clockwise direction, the push rod spring 143 can pull the upper push rod 141 in a downward direction.

Thus, the upper push rod 141 may press the air injection pin 151 of the control valve 150. When the air injection pin 151 is pressed, the compressed air of the compressed air tank 50 may be supplied to the control valve 150 via the compressed air supply port 153 of the control valve 150.

Further, the supplied compressed air may be supplied into the air spring 160 via the air spring connection port 154 of the control valve 150. The air spring 160 may be expanded by the supplied compressed air. Here, one side of the air spring 160 may be fixed to the lower frame 20.

As the air spring 160 is expanded, an air spring support 177 of the inner link 172 may be pushed upwards. When the air spring support 177 moves upwards, the width of the X-shaped link 170 may be reduced. As the width of the X-shaped link 170 is reduced, the height of the vehicle seat can be increased.

Figure 5:
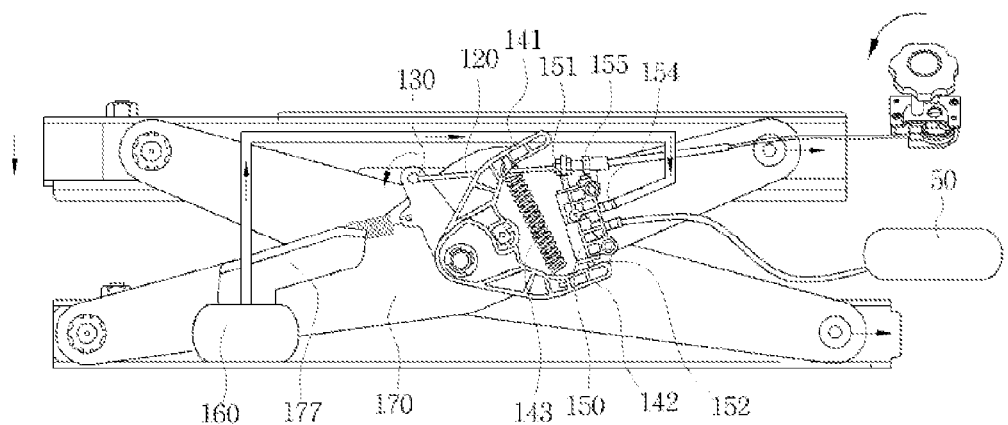
FIG. 5 is a view showing a second operation state of the seat height adjusting apparatus of the present invention.

FIG. 5 is a view showing a second operation state of the seat height adjusting apparatus of the present invention.

Referring to FIG. 5, when the height adjusting lever 110 is rotated in a counterclockwise direction, the height adjusting cable 120 connected to the height adjusting lever 110 may move in the other direction. Here, the end of the height adjusting cable 120 may be connected with the arm rod 130.

Thus, the arm rod 130 may be rotated about its central axis by a predetermined angle in the counterclockwise direction. The predetermined angle may be based on an amount of rotation of the height adjusting lever 110.

As the arm rod 130 rotates, the upper push rod 141 can be rotated in a counterclockwise direction. When the upper push rod 141 is rotated in the counterclockwise direction, the push rod spring 143 can pull the lower push rod 142 in an upward direction.

Thus, the lower push rod 142 may press the air discharge pin 152 of the control valve 150. When the air discharge pin 152 is pressed, the compressed air in the air spring 160 may be discharged to the outside via an exhaust port 155 located at the upper portion of the control valve 150. The air spring 160 may be contracted by the discharged compressed air.

As the air spring 160 is contracted, an air spring support 175 of the inner link 172 may move downwards. Here, one side of the air spring 160 may be fixed to the lower frame 20. Thus, when the air spring support 175 moves downwards, the width of the X-shaped link 170 can be increased. As the width of the X-shaped link 170 increases, the height of the vehicle seat can be reduced.

As described above, the height of the vehicle seat can be adjusted by the rotation of the height adjusting lever 110. Thus, the rotation of the height adjusting lever 110 is transmitted to the arm rod 130 via the height adjusting cable 120, so that the arm rod 130 can be rotated.

When the arm rod 130 is rotated, the upper and lower push rods 141 and 142 connected by the push rod spring 143 can be rotated. As the upper and lower push rods 141 and 142 are rotated, the air injection pin 151 or the air discharge pin 152 of the control valve 150 can be selectively pressed.

The control valve 150 may adjust an amount of compressed air supplied into the air spring 160. Thus, a passenger can adjust the height of the vehicle seat exclusively by way of the operation of the height adjusting lever 110 without a separate cylinder or valve device.

While the present invention has been described with respect to the specific embodiments, it will be apparent to those skilled in the art that various changes and modifications may be made without departing from the spirit and scope of the invention as defined in the following claims.

According to the present invention, in comparison to a conventional cylinder type height adjusting device, the height of the vehicle seat can be adjusted by a more convenient way.

That is, the height adjusting lever is operated to rotate the arm rod and then the push rod connected by the push rod spring, and thus the air injection pin or the air discharge pin of the control valve is selectively pressed. Thereby, the height of the vehicle seat can be adjusted only by the operation of the height adjusting lever without a separate cylinder or valve configuration.

Further, manufacturing costs can be reduced due to a simple structure and a simple assembly process.

What is claimed is:

1. A seat height adjusting apparatus for a vehicle, comprising:
    an air spring configured to raise or lower a seat of the vehicle;
    a control valve connected to the air spring and configured to selectively supply air to the air spring;
    a push rod configured to selectively press an air injection pin or an air discharge pin of the control valve;
    an arm rod fastened to the push rod and configured to rotate the push rod;
    a height adjusting cable fastened to one side of the arm rod and configured to rotate the arm rod; and
    a height adjusting lever configured to move the height adjusting cable in one direction, wherein the push rod includes:
    an upper push rod rotated in a downward direction to selectively press the air injection pin; and
    a lower push rod rotated in an upward direction to selectively press the air discharge pin, and wherein the push rod further includes a push rod spring connecting the upper and lower push rods.

2. The seat height adjusting apparatus of claim 1, further comprising an X-shaped link fastened to one side of the vehicle seat and subjected to a variation in width by an air pump.

3. The seat height adjusting apparatus of claim 1, wherein the upper and lower push rods are coupled with a rotational shaft of the arm rod.

* * * * *